United States Patent [19]

Furue et al.

[11] Patent Number: 4,916,310

[45] Date of Patent: Apr. 10, 1990

[54] IMAGE READ-OUT APPARATUS WITH IMAGE SIGNAL ADDING

[75] Inventors: Ryousuke Furue; Toshitaka Agano, both of Kanagawa, Japan

[73] Assignee: Fuji Photo Film Co., Ltd., Kanagawa, Japan

[21] Appl. No.: 260,110

[22] Filed: Oct. 20, 1988

[30] Foreign Application Priority Data

Oct. 20, 1987 [JP] Japan .................. 62-265001

[51] Int. Cl.$^4$ .............................................. H01J 3/14
[52] U.S. Cl. ...................................... 250/236; 358/496
[58] Field of Search ........................ 250/234, 235, 236; 358/293, 294, 496

[56] References Cited

U.S. PATENT DOCUMENTS 4,288,820 9/1981 Minamibashi et al. ............. 358/294
4,313,138 1/1982 Kanda .................................. 358/293
4,791,304 12/1988 Iida ..................................... 250/236

Primary Examiner—David C. Nelms
Attorney, Agent, or Firm—Sughrue, Mion, Zinn, Macpeak & Seas

[57] ABSTRACT

In an image read-out method, image signals are obtained by scanning a material-to-be-scanned, which carries an image recording thereon and which is conveyed in a sub-scanning direction, by a light beam deflected by a rotating polygon mirror in a main scanning direction approximately normal to the sub-scanning direction, and photoelectrically detecting light, which carries the image and which is obtained from a portion scanned by the light beam, by a photodetector. The image signals each obtained in each of main scanning steps in a number obtained by a single turn of the rotating polygon mirror or turns thereof in a number equal to integral multiples of one are addition-processed to obtain an image signal over a single main scanning line.

2 Claims, 2 Drawing Sheets

IMAGE READ-OUT APPARATUS WITH IMAGE SIGNAL ADDING

BACKGROUND OF THE INVENTION

1. Field of the Invention

This invention relates to an image read-out method for reading out an image from a material-to-be-scanned by scanning the material-to-be-scanned carrying the image recorded thereon by a light beam and photoelectrically detecting light obtained from the material-to-be-scanned and carrying the image.

2. Description of the Prior Art

There have heretofore been used widely image read-out apparatuses for obtaining image signals by conveying a material-to-be-scanned carrying an image recorded thereon in a sub-scanning direction, scanning the material-to-be scanned by a light beam deflected by a light deflector in a main scanning direction approximately normal to the subscanning direction, thereby obtaining light carrying the image, and photoelectrically detecting the light carrying the image by a light detection means.

By way of example, various laser beam sources can be used as the source of the light beam. As the light deflector for deflecting the light beam to have the light beam scan in the main scanning direction, a rotating polygon mirror rotated quickly is mainly used by virtue of comparatively high scanning stability.

In the case where the rotating polygon mirror is used as the light deflector, the problem as described below arises even though the scanning stability is comparatively high. Specifically, in the case where surfaces of the rotating polygon mirror have even a slight inclination relative to one another (surface inclination, i.e. fluctuations in the angle between a rotation shaft of the rotating polygon mirror and a normal line of each surface), the scanning position of the light beam reflected by the rotating polygon mirror o the material-to-be-scanned fluctuates in the sub-scanning direction among the surfaces of the rotating polygon mirror. As a result, the image signals detected photoelectrically become as if the conveyance in the sub-scanning direction were uneven periodically with a period equal to the time corresponding to a single turn of the rotating polygon mirror.

In order to eliminate the adverse effects of the surface inclination of the rotating polygon mirror, a compensating optical system constituted by a cylindrical lens, a toroidal lens or the like have heretofore been used so that a scanning line is formed at a predetermined position even though surface inclination arises. Such a compensating optical system is large and complicated, and makes the apparatus large and expensive.

SUMMARY OF THE INVENTION

The primary object of the present invention is to provide an image read-out method which eliminates nonuniformity in image signals caused by surface inclination of a rotating polygon mirror for deflecting a light beam without a compensating optical system being used.

Another object of the present invention is to provide an image read-out method which eliminates adverse effects of surface inclination of a rotating polygon mirror without an apparatus for carrying out the method becoming large and expensive.

The present invention provides an image read-out method for obtaining image signals by scanning a material to be scanned, which carries an image recorded thereon and which is conveyed in a sub-scanning direction, by a light beam deflected by a rotting polygon mirror in a main scanning direction approximately normal to the sub-scanning direction, and photoelectrically detecting light, which carries the image and which is obtained from a portion scanned by the light beam, by a light detection means, wherein the improvement comprises the steps of:

(i) adding image signals each obtained in each of main scanning steps in a number obtained by a single turn of said rotating polygon mirror or turns thereof in a number equal to integral multiples of one, and (ii) obtaining an image signal over a single main scanning line.

Conveyance of the material to be scanned in the sub-scanning direction may be stopped as long as the image signals in the main scanning steps in a number obtained by a single turn of the rotating polygon mirror or turns thereof in a number equal to integral multiples of one are obtained. After the image signals are obtained, the material to be scanned may be step-fed by a distance corresponding to a single picture element in the sub-scanning direction, and may thereafter be fed intermittently to obtain image signals in the next main scanning steps in a number obtained by a single turn of the rotating polygon mirror or turns thereof in a number equal to integral multiples of one. Alternatively, the material to be scanned may be conveyed continuously so that it is scanned by a distance corresponding to a single picture element in the sub-scanning direction while the image signals in the main scanning steps in a number obtained by a single turn of the rotating polygon mirror or turns thereof in a number equal to integral multiples of one are being obtained.

Nonuniformity in the image signals caused by inclination of each surface of the rotating polygon mirror arises repeatedly each time the rotating polygon mirror is rotated a single turn. Therefore, in the case where the image signals each obtained in each of main scanning steps in a number obtained by a single turn of the rotating polygon mirror or turns thereof in a number equal to integral multiples of one are added and the image signal over a single main scanning line is obtained, a mean-level image signal among the image signals obtained in the main scanning steps can be obtained, and the nonuniformity caused in the image signals by surface inclination of the rotating polygon mirror can be eliminated without a complicated, expensive optical system for compensation for the surface inclination being used.

DESCRIPTION OF THE PREFERRED EMBODIMENTS

The present invention will hereinbelow be described in further detail with reference to the accompanying drawings.

Figure 1:
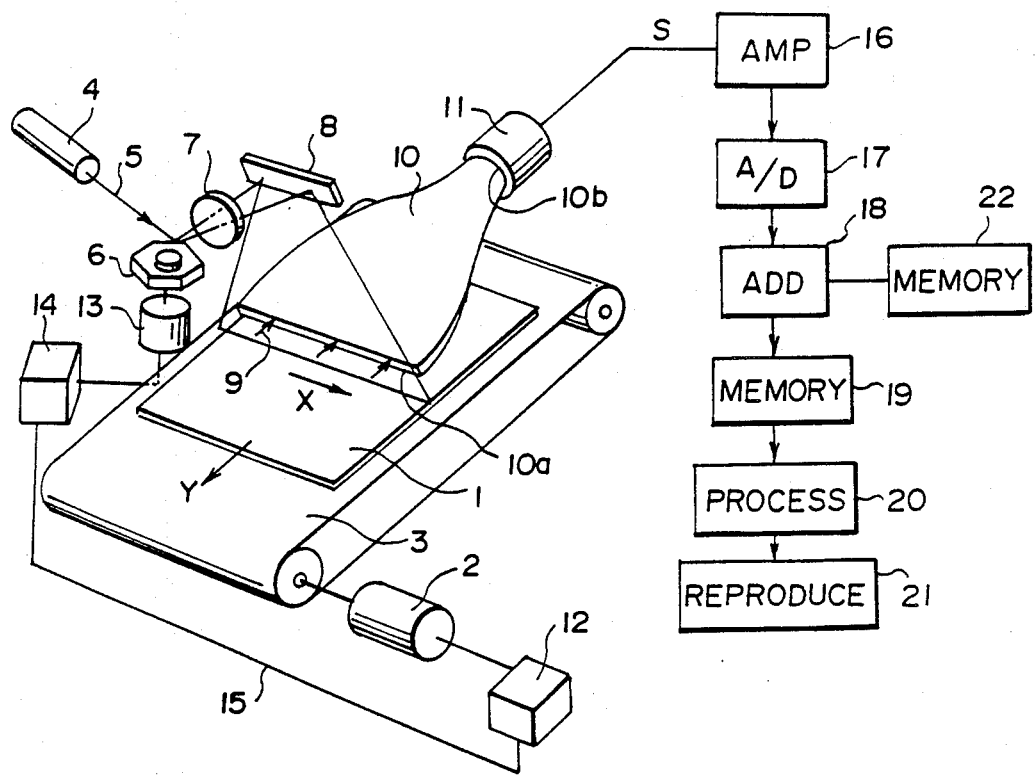
FIG. 1 is a perspective view showing a radiation image read-out apparatus wherein the image read-out method in accordance with the present invention is employed.

With reference to FIG. 1, a stimulable phosphor sheet 1 carrying a radiation image of an object stored thereon is conveyed continuously or intermittently as will be described later in a sub-scanning direction as indicated by the arrow Y by a sheet conveyance means 3 constituted by an endless belt or the like operated by a motor 2. When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor, and a sheet provided with a layer of the stimulable phosphor is referred to as the stimulable phosphor sheet. On the other hand, stimulating rays 5 produced by a laser beam source 4 are reflected and deflected by a rotating polygon mirror 6 quickly rotated by a motor 13 in the direction as indicated by the arrow, and pass through a converging lens 7 constituted by a fθ lens or the like. The main scanning step starts in the optical path of the stimulating rays 5 is then changed by a mirror 8, and the stimulating rays 5 impinge upon the stimulable phosphor sheet 1 and finally scan it in a main scanning direction as indicated by the arrow X approximately normal to the sub-scanning direction as indicated by the arrow Y. As the stimulable phosphor sheet 1 is exposed to the stimulating rays 5, the exposed portion of the stimulable phosphor sheet 1 emits light 9 in an optical amount proportional to the stored radiation energy. The emitted light 9 is guided by a light guide member 10, and photoelectrically detected by a photomultiplier 11 as a photodetector. The light guide member 10 is made by the forming of a light guiding material such as an acrylic plate, and has a linear light input face 10a positioned to extend along the main scanning line on the stimulable phosphor sheet 1, and a ring-shaped light output face 10b closely contacted with a light receiving face of the photomultiplier 11. The emitted light 9 entering the light guide member 10 from its light input face 10a is guided through total reflection inside of the light guide member 10, emanates from the light output face 10b, and is received by the photomultiplier 11. In this manner, the amount of the emitted light 9 carrying the radiation image is detected by the photomultiplier 11.

The rotating polygon mirror 6 is rotated quickly, and the stimulating rays 5 reflected and deflected by the rotating polygon mirror 6 quickly scan the stimulable phosphor sheet 1. In order add image signals obtained in each of main scanning steps in the X direction in a number obtained by a single turn of the rotating polygon mirror 6 or turns thereof in a number equal to integral multiples of one and to obtain an image signal over a single main scanning line, it is necessary to synchronize the rotation speed of the rotating polygon mirror 6 with the conveyance speed of the sheet conveyance means 3 for continuously or intermittently sub-scanning the stimulable phosphor sheet 1 in the Y direction. For this purpose, the synchronization is achieved by connecting a control device 14 for controlling the rotation speed of the motor 13 for operating the rotating polygon mirror 6 with a control device 12 for controlling the rotation speed of the motor 2 by a signal line 15.

Figure 2A:
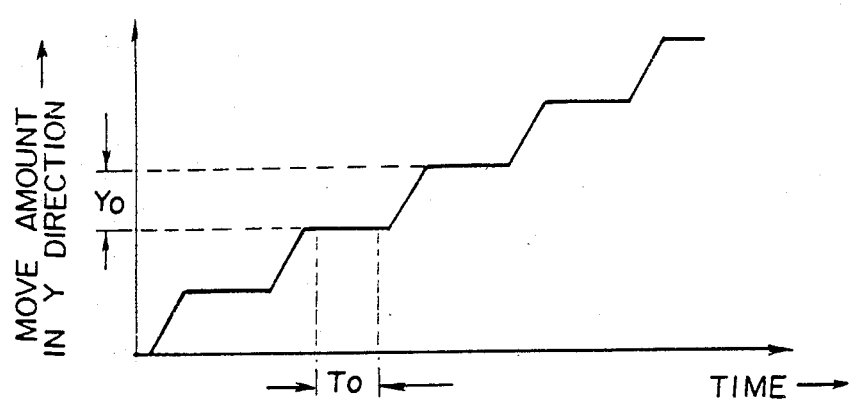
FIGS. 2A and 2B are explanatory graphs showing the sub-scanning in the apparatus shown in FIG. 1.
Figure 2B:
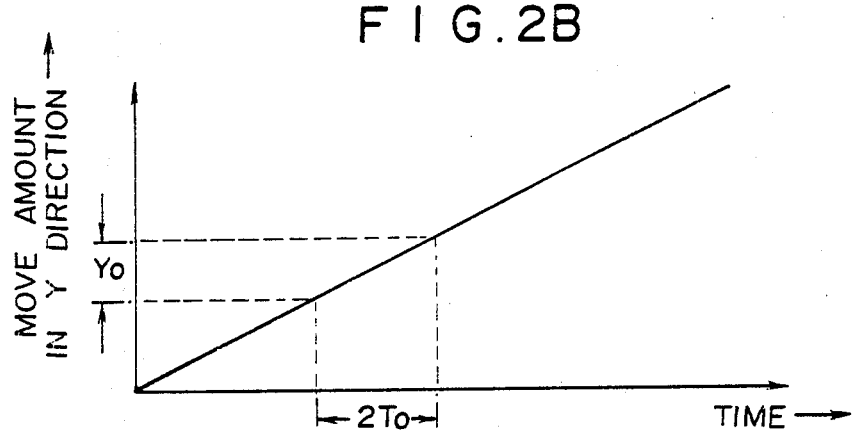

FIGS. 2A and 2B show the relationships between the amount of movement of the stimulable phosphor sheet 1 in the Y direction and the time as a result of the synchronization control carried out as mentioned above. In FIGS. 2A and 2B, To denotes the time taken for the rotating polygon mirror 6 to rotate a single turn, and Yo denotes the movement amount of the stimulable phosphor sheet 1 in the Y direction corresponding to a single picture element.

FIG. 2A shows the case wherein the stimulable phosphor sheet 1 is fed intermittently. In this example, the stimulable phosphor sheet 1 is fed intermittently by the movement amount Yo each time the rotating polygon mirror 6 is rotated a single turn. Addition of the image signals is carried out as will be described later by taking as effective only the image signals obtained in each of the main scanning steps carried out in the time To for which the stimulable phosphor sheet 1 is stationary, and the image signals obtained by the next turn of the rotating polygon mirror 6 following said time To are neglected.

FIG. 2B shows the case wherein the stimulable phosphor sheet 1 is fed continuously. In this example, the stimulable phosphor sheet 1 is conveyed by the movement amount Yo each time the rotating polygon mirror 6 is rotated two turns. Therefore, the image signal over a single main scanning line is obtained by the addition of the image signals obtained in each of the main scanning steps carried out by two turns of the rotating polygon mirror 6.

The conveyance of the stimulable phosphor sheet 1 is controlled in the manner as mentioned above. The addition of the image signals obtained in each of the steps of main scanning by the stimulating rays will hereinbelow be described with reference to FIG. 1.

Analog signals S generated by the photomultiplier 11 are amplified by an amplifier 16, and digitized with a predetermined scale factor in an A/D converter 17. The digital image signals thus obtained are fed to an addition device 18 which carries out addition processing. The addition device 18 discriminates whether the fed signals are to be made effective or neglected in the case of the intermittent feed. The image signals obtained in each of main scanning steps carried out by a single turn of the rotating polygon mirror 6 or turns thereof in a number equal to integral multiples of one and corresponding to the subscanning over a single picture element on the stimulable phosphor sheet in the Y direction are classified as a single group. Thereafter, the addition device 18 add the image signals obtained at the same position in the X direction on the stimulable phosphor sheet 1 in each group.

Figure 3:
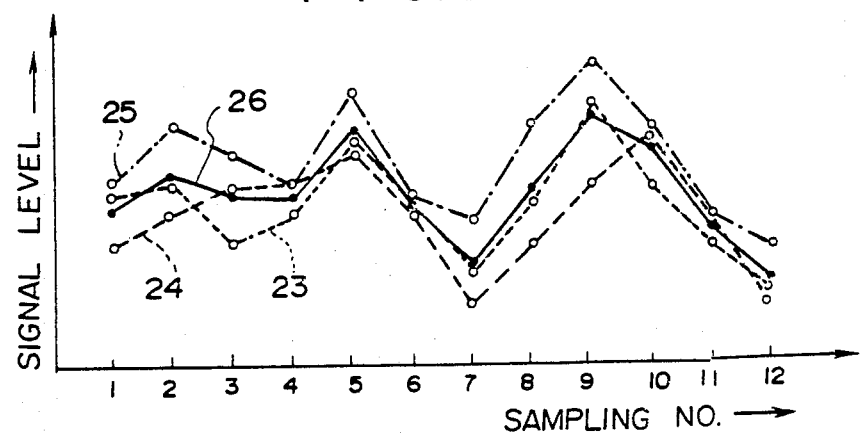
FIG. 3 is an explanatory graph showing the addition of image signals.

The addition will be described in further detail with reference to FIG. 3. Lines 23, 24 and 25 indicate the image signals corresponding to each main scanning line obtained by a single turn of the rotating polygon mirror 6. Though the rotating polygon mirror 6 is generally constituted by more mirror surfaces, the number of the mirror surfaces is herein taken to be three for simplicity of explanation. A single group for the addition as mentioned above is formed by the lines 23, 24 and 25. The image signals indicated by the lines 23, 24 and 25 are obtained by being sampled by the A/D converter 17 shown in FIG. 1 to correspond to clock pulses (not shown) in synchronization with the main scanning of the stimulating rays. In these image signals, the values at each sampling No. corresponding to the same position in the X direction are added, and a value obtained by the addition is scaled appropriately. A line 26 indicates the case wherein the values of the lines 23, 24 and 25 at each sampling No. are added, and the value obtained by the addition is scaled to $\frac{1}{3}$ (i.e. the mean value of said values is calculated).

Reverting to FIG. 1, a memory 22 stores the read-out image signals for carrying out the aforesaid addition. The aforesaid addition is carried out after a single group for a single operation of addition processing has been stored in the memory 22. Image signals thus obtained by the addition are sequentially stored in a memory 19 composed of an optical disk, a magnetic disk or the like, and the read-out image signals over the overall surface of the stimulable phosphor sheet 1 are thus stored in the memory 19.

At the time the radiation image which was stored on the stimulable phosphor sheet 1 is to be reproduced into a visible image, the read-out image signals read from the large-capacity memory 19 are fed to an image reproducing apparatus 21 composed of a CRT, a light beam scanning recording apparatus or the like via an image processing apparatus 20. In the image reproducing apparatus 21, the radiation image which was stored on the stimulable phosphor sheet 1 is reproduced as a visible image.

In the aforesaid embodiment, the addition is carried out prior to storage in the memory 19, and therefore the image signals prior to the addition are not stored. In the case where the image signals prior to the addition are to be stored, both the image signals prior to the addition and the image signals obtained by the addition may be stored in the memory 22. Alternatively, addition processing may not be carried out prior to the storage in the memory, only the image signals prior to the addition may be stored in the memory, and the stored image signals prior to the addition may be read from the memory for carrying out addition processing and reproduction of a visible image. With some kinds of the image reproducing apparatus such as the light beam scanning recording apparatus, the same effects as the reproduction after addition processing can be obtained by feeding out the image signals in each group for the addition one upon another on the same line without carrying out the aforesaid addition operation. The term "addition" as used herein also embraces such a case.

In the aforesaid embodiment, the image read-out method in accordance with the present invention is applied to the radiation image read-out apparatus. However, the image read-out method in accordance with the present invention is also applicable to an image read-out apparatus for reading out an image reflected by a recording medium or an image passing through the recording medium.

We claim:

1. An image read-out method for obtaining image signals by scanning a material to be scanned, which carries an image recorded thereon and which is conveyed in a sub-scanning direction, by a light beam deflected by a rotating polygon mirror having a plurality of mirror surfaces, in a main scanning direction approximately normal to the sub-scanning direction, and photoelectrically detecting light, which carries the image and which is obtained from a portion scanned by the light beam, by a light detection means to produce image signals, an image signal corresponding to the detected light produced over a single scan of a scanning line in the main scanning direction, wherein the improvement comprises the steps of:

obtaining image signals, each obtained in each of main scanning steps, in a number obtained by a single turn of said rotating polygon mirror or n turns thereof, where n is an integral multiple of one, (ii) adding said number of image signals to obtain a summed image signal over a single main scanning line and (iii) identifying as the image signal representative of image information in a scanning line the summed image signal for that scanning line.

2. A method as defined in claim 1, wherein said material to be scanned is a stimulable phosphor sheet carrying a radiation image stored thereon, and said light beam is stimulating rays which cause the stimulable phosphor sheet to emit light in proportion to the stored radiation energy.

* * * * *